(12) United States Patent
Ciampini

(10) Patent No.: US 11,111,417 B2
(45) Date of Patent: Sep. 7, 2021

(54) ADHESIVES FOR ASSEMBLING COMPONENTS OF INERT MATERIAL

(71) Applicant: SICPA HOLDING SA, Prilly (CH)

(72) Inventor: Davide Ciampini, Pavone Canavese (IT)

(73) Assignee: SICPA HOLDING SA, Prilly (CH)

( * ) Notice: Subject to any disclaimer, the term of this patent is extended or adjusted under 35 U.S.C. 154(b) by 53 days.

(21) Appl. No.: 16/303,048

(22) PCT Filed: May 19, 2017

(86) PCT No.: PCT/EP2017/062112
§ 371 (c)(1),
(2) Date: Nov. 19, 2018

(87) PCT Pub. No.: WO2017/198820
PCT Pub. Date: Nov. 23, 2017

(65) Prior Publication Data
US 2019/0300753 A1    Oct. 3, 2019

(30) Foreign Application Priority Data

May 19, 2016  (EP) .................................. 16170330

(51) Int. Cl.
*C09J 4/06* (2006.01)
*C08G 59/22* (2006.01)
(Continued)

(52) U.S. Cl.
CPC ............... *C09J 4/06* (2013.01); *C08G 59/22* (2013.01); *C08G 65/2603* (2013.01); *C08K 5/01* (2013.01);
(Continued)

(58) Field of Classification Search
CPC ........................................................ C09J 4/06
See application file for complete search history.

(56) References Cited

U.S. PATENT DOCUMENTS

2005/0068368 A1* 3/2005 Ishizuka ................ B41J 2/1606
347/45
2010/0160557 A1* 6/2010 Murofushi ......... C08G 18/3853
525/55
(Continued)

FOREIGN PATENT DOCUMENTS

| CN | 1304945 | 7/2001 |
|---|---|---|
| CN | 1887998 | 1/2007 |

(Continued)

OTHER PUBLICATIONS

McGraw-Hill Chemical engineering (2006) "Epoxy Adhesive Formulations," 554 pages.
(Continued)

*Primary Examiner* — Daniel H Lee

(74) *Attorney, Agent, or Firm* — Muncy, Geissler, Olds & Lowe, P.C.

(57) ABSTRACT

The present invention relates to adhesive formulations for bonding materials, comprising 40 to 80 wt.-% of an epoxy monomer, and 15 to 30 wt.-% of an oxetane monomer, and 0.1 to 10 wt.-% of an adhesion promotor, and 0.1 to 5 wt.-% of a sensitizer, and 1 to 10 wt.-% of a radiation and temperature activable photoinitiator or a mixture of a photoinitiator and a thermal initiator. Further, the present invention relates to a method for bonding at least two parts of which one is at least an inert material, comprising the steps applying to one part an adhesive formulation as described, placing another part to be bond on the one part, exposing the parts to UV light radiation and heat treating of the part.

13 Claims, 4 Drawing Sheets

(51) Int. Cl.
  *C08G 65/26* (2006.01)
  *C08K 5/01* (2006.01)
  *C08K 5/07* (2006.01)
  *C08K 5/09* (2006.01)
  *C08K 5/375* (2006.01)
  *C08K 5/5435* (2006.01)
  *C08K 5/56* (2006.01)
  *C09J 5/06* (2006.01)
  *C09J 163/00* (2006.01)

(52) U.S. Cl.
  CPC .................. *C08K 5/07* (2013.01); *C08K 5/09* (2013.01); *C08K 5/375* (2013.01); *C08K 5/5435* (2013.01); *C08K 5/56* (2013.01); *C09J 5/06* (2013.01); *C09J 163/00* (2013.01); *C09J 2301/416* (2020.08)

(56) References Cited

U.S. PATENT DOCUMENTS

| | | | | |
|---|---|---|---|---|
| 2011/0082238 A1* | 4/2011 | Patel | ...................... | C09D 11/36 523/400 |
| 2011/0282010 A1 | 11/2011 | Fujita | | |
| 2014/0302430 A1* | 10/2014 | Nawrocki | ............... | C08L 63/00 430/18 |

FOREIGN PATENT DOCUMENTS

| | | |
|---|---|---|
| CN | 102471456 | 5/2012 |
| CN | 103119080 | 5/2013 |
| CN | 105441001 | 3/2016 |
| EP | 1133971 | 9/2001 |
| EP | 2041217 | 4/2009 |
| JP | 2003-152248 A | 5/2003 |
| JP | 2010-163566 A | 7/2010 |
| RU | 2016037 | 7/1994 |

OTHER PUBLICATIONS

Database WPI Week 201651, Derwent World Patents Index; IN 2016-23041U, XP002763892, (2016), 2 pages.
International Search Report and Written Opinion issued with respect to application No. PCT/EP2017/062112, 9 pages.
International Preliminary Examination Report issued with respect to application No. PCT/EP2017/062112, 7 pages.
Practical Manual for Chinese Anticorrosion Engineers (1st Volume), 2001, p. 536 along with English Translation of the same, 1 page.
Bonding Principle and Practical bonding formulae—600 Kinds (vol. II), 1985, p. 204 along with English Translation of the same, 1 page.
Chinese Office Action in counterpart Chinese Application No. 201780030689.4 dated Aug. 18, 2020 (and English language translation of the Office Action).
Russian Office Action in counterpart Russian Application No. 2018140415 dated Aug. 18, 2020 (and English language translation of the Office Action).
Japanese Office Action in counterpart Japanese Application No. P2018-556288 dated Feb. 2, 2021 (and English language translation of the Office Action).

* cited by examiner

Figure 5 (aromatic epoxy oligomer (Araldite 9699))
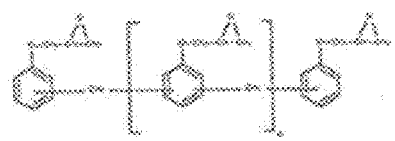
Figure 6 (photosensitizer (9,10-dibuthoxy anthracene))
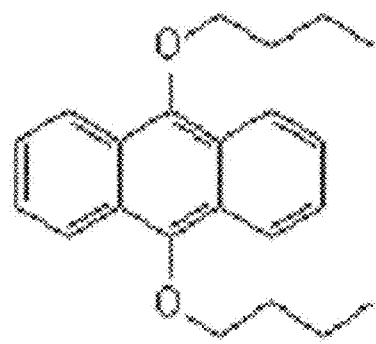
Figure 7 (adhesion promoter (Silquest A187))
Figure 8 (oxetane monomer (OXT 221))
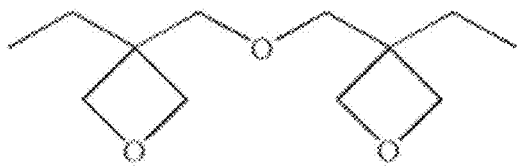

Figure 9 (fluorinated epoxy monomer (3-Perluorooctyl-1,2-propenoxide))
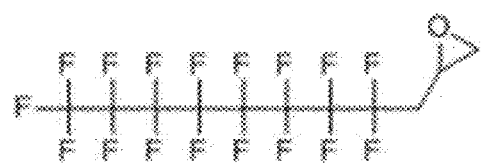
Figure 10 (cycloaliphatic epoxy monomer (Celloxide 2021P))
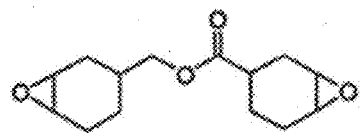

ADHESIVES FOR ASSEMBLING COMPONENTS OF INERT MATERIAL

TECHNICAL FIELD

The present invention relates to methods and formulations for bonding components of inert material. More specifically, the present invention relates to bonding of components of impregnated or impermeabilized respectively material showing good bonding strength after curing and good resistance to water and solvents.

BACKGROUND

The inertness of material, in particular of impregnated porous material can be a problem for bonding of components. This is due to the absence of reactive groups on the materials to be bonded and on which the glue should develop some chemical interactions.

A revolution in the development of high performance engineering adhesives occurred in the past few years. Technological advances in the chemistry of locking, sealing, retaining and structural adhesives brought us to an era of rapid innovation in the assembly and maintenance of mechanical components.

Hernon Manufacturing, Inc. developed acrylic and epoxy based resins which have been used for adhesive purposes. Acrylics have unique performances capabilities, its high peel and high impact strengths are combined to deliver tough, durable and shock resistant bonds. It has ability to bond wide range of materials, excellent gap fills and fast fixture time.

From the publication McGraw-Hill Chemical engineering (2006) "Epoxy Adhesive Formulations" a range of epoxy, acrylics as well as epoxy-acrylic hybrid formulation for adhesion of a diverse class of materials is known.

In particular when bonded structures are used in a chemical solvent environment, the bonding material should ideally be stable for all the life of the system in which they are used in order to prevent any defect of application they are used for.

It is an object of the present invention to provide a system and method addressing these needs and solving the drawbacks from the prior arts.

SUMMARY

The above mentioned problems and drawbacks of the conventional concepts are solved by the subject-matter of the embodiments of the present invention.

DETAILED DESCRIPTION

According to one aspect, the invention suggests an adhesive formulation for bonding materials, comprising
  40 to 80 wt.-% of an epoxy monomer; and
  15 to 30 wt.-% of an oxetane monomer; and
  0.1 to 10 wt.-% of an adhesion promotor; and
  0.1 to 5 wt.-% of a sensitizer; and
  1 to 10 wt.-% of a radiation and temperature activable photoinitiator or a mixture of a photoinitiator and a thermal initiator.

The formulation according the invention is able to secure a bonding even between parts of two highly inert materials.

This adhesion formulation according to the invention was found to have a high strength after curing and good resistance to water and solvents.

With such a formulation preferably bonding of different components such as microelectronic components and/or silicon chips can be achieved to a good extent.

Even when impregnated highly inert materials were used, a good bonding could be achieved. Impregnation or impermeabilization, respectively, is usually used to limit penetration of liquid in a porous material.

According to a preferred embodiment of the invention the epoxy monomer is selected from the group comprising aromatic epoxy oligomer ARALDITE 9699 (Huntsman), cycloaliphatic epoxy monomer CELLOXIDE 2021P (Daicel), 3,4-Epoxycyclohexylmethyl 3,4-epoxycyclohexanecarboxylate (Sigma-Aldrich), Diglycidyl 1,2-cyclohexanedicarboxylate (Sigma-Aldrich), Cyclohexene oxide (Sigma-Aldrich), 1,2,5,6-Diepoxycyclooctane (Sigma-Aldrich) and/or Poly[(phenyl glycidyl ether)-co-formaldehyde] (Sigma-Aldrich).

Good results were achieved, when the oxetane monomer is selected from the group comprising oxetane monomer OXT221 (Toagosei Chemical), 3-Ethyl-3-oxetanemethanol (Sigma-Aldrich), 3,3-Dimethyloxetane (Sigma-Aldrich) and/or 3-ethyl-3-[(2-ethylhexyloxy)methyl]oxetane (OXT 212) (Toagosei chemical).

According to another preferred embodiment of the invention the adhesion promotor is a silane-epoxy adhesion promoter, preferably selected from the group comprising silane-epoxy adhesion promoter SILQUEST A187 (Momentive), (3-Glycidyloxypropyl)triethoxysilane (Sigma-Aldrich), (3-Glycidyloxypropyl)trimethoxysilane (Sigma-Aldrich) and/or Trimethoxy[2-(7-oxabicyclo[4.1.0]hept-3-yl)ethyl]silane (Sigma-Aldrich).

Advantageously the sensitizer is a UV-Vis sensitizer, preferably selected from the group comprising UV-Vis sensitizer Anthracure UVS 1331 (Kawasaki Chemical), Anthracene (Sigma-Aldrich), 9-Fluorenone (Sigma-Aldrich), perylene (Sigma-Aldrich) and/or 9,10 diethoxy anthracene (UV-Vis sensitizer UVS 1101) (Kawasaki Kasei Chemicals).

Further, the radiation and temperature activable photoinitiator is preferably a cationic photoinitiator, more preferably PAG GSID26-1 (BASF).

If a mixture of photoinitiator and thermal initiator is used for the formulation according to the invention, the thermal initiator is preferably an anhydride, preferably selected from the group Phtalic anhydride (Sigma-Aldrich); Maleic anhydride (Sigma-Aldrich); Cyclobutane-1,2,3,4-tetracarboxylic dianhydride (Sigma-Aldrich); Benzoic anhydride (Sigma-Aldrich) and/or Oleic anhydride (Sigma-Aldrich) and the photoinitiator is a cationic photoinitiator, preferably selected from the group PAG Irgacure 290 (BASF), Diphenyliodonium hexafluorophosphate (Sigma-Aldrich), diphenyliodonium hexafluoroantimonate (Sigma-Aldrich), Triarylsulfonium hexafluorophosphate salts (Sigma Aldrich) and/or Triphenylsulfonium triflate (Sigma-Aldrich).

Good results could be achieved, if the formulation further comprises a fluorurated epoxy monomer, preferably selected from the group 3-Perluorooctyl-1,2-propenoxide (Fluorochem), 3-PERFLUOROHEXYL-1,2-EPDXYPROPANE (Sigma-Aldrich) (Chemical Co., Ltd) and/or 3-[2-(Perfluorohexyl)ethoxy]-1,2-epoxypropane (TCI American).

According to another aspect, the invention refers to a method for bonding at least two parts of which one is at least an inert material, comprising the following steps:
  Applying to one part an adhesive formulation according to any of the preceding embodiments;
  placing another part to be bonded on the one part;
  exposing the parts to UV light radiation; and
  heat treating of the part.

After the parts to be bonded are overlapped with the use of an adhesive according to the invention, some adhesive is sticking out. Due to the presence of a photoinitiator as part of the formulation this exposed or protruding photoinitiator is photoreticulated by UV exposure, assuring the positioning and alignment of the chip during the next manufacturing steps. Afterwards a heat treatment is carried out in order to promote the reticulation of the "shielded area" (the area between the two parts) of the adhesive.

The adhesive according to the invention can for example be used for bonding silicon chips on impregnated/impermeabilized, inert material.

As the formulation can also be thermally cured, high performances, like e.g. solvent resistance, can be achieved also in areas where the adhesive is shielded to the UV radiation.

The formulation leads to a bonding with high chemical resistance towards water and e.g. water based inks, once cured.

Further the formulation shows a good adhesion towards the inert material.

According to the invention an epoxy monomer is used, as it shows a high viscosity, is photo/thermally reticulable and improves the solvent resistance.

The presence of an oxetane monomer is photo/thermally cross-linkable and reduces the final viscosity of the adhesive.

The adhesion promotor advantageously improves the adhesion of the adhesive formulation.

The sensitizer could advantageously sensitize the formulation to wavelengths, to which the photoinitiator is not sensitive.

The photoinitiator as part of the formulation photoinitiates the cross-linking of the monomer in the formulation.

According to another aspect, the invention relates to the use of the formulation for bonding impregnated/impermeabilized graphite material to a silicon material.

SHORT DESCRIPTION OF THE DRAWINGS

The present invention will be described for the sake of better understanding by way of exemplary embodiments. These embodiments may be best understood by taking the following drawings in consideration. Within the figures of these drawings, same reference numerals are used for features that are identical or have an identical or similar function. In these figures, FIG. 1 shows cross-section of a print-bar;

FIGS. 5 to 10 shows the chemical structure of examples of the components of the formulation according to preferred embodiments.

DESCRIPTION OF PREFERRED EMBODIMENTS

For example in order to develop an ink-jet printing system for water and/or solvent based inks it is necessary to have a set of materials compatible with the liquids to be printed via the printing system. The liquids mustn't damage the constituting parts of the printing system and the bondings of their parts in order to avoid defects during the life of the printing machine.

Figure 1:
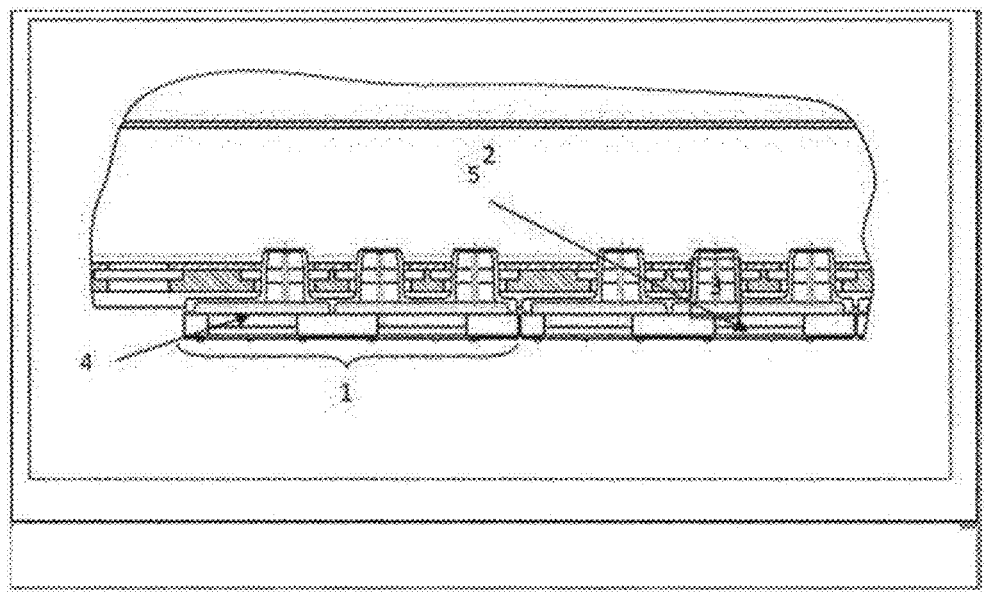

Usually a printing bar of a printing system comprises a series of printing modules (1) such as that represented in FIG. 1.

In such a printing bar ink is coming from an ink reservoir and reaches the ejector groups by passing through holes dug into a porous material (4).

The printing bar is composed by one or more than one graphite modules (1), each connected to a macrohydraulic channel (2) by passing through holes (3). The channel conveys the ink to the modules and specifically to each ejector group (5).

Preferred materials used for the component (4) have a linear thermal dilatation coefficient as similar as possible to silicon ($\approx 3*10-6°$ C.−1) as the print head will contain silicon parts, which will be bonded to the component (4). The similarity of the two thermal coefficients avoids damages to the silicon chips once bonded to the material (4), these damages can be a consequence of thermal stresses due to the manufacturing process.

There are not so many materials on the market involving reasonable cost and easy workability by means of common techniques and linear thermal dilatation coefficient near to 10−6° C.−1. One of these materials is graphite.

These materials are often characterized by a high porosity (at micro and nanometric scale) that could be a problem under the point of view of permeability to liquids and compatibility with glues or encapsulants used during the assembling process.

Therefore impregnating liquid formulations are used, suitable for the application and compatible with the manufacturing process.

The material is preferably compatible with water and solvent inks without exhibiting any damage after a 7 weeks contact at 45° C. This composite polymeric-graphite material is very inert and does not release contaminants into the liquids during the life of the printing system.

This inertness could be a problem for the bonding procedures of components (silicon chips) on the graphite material (4) as a consequence of the absence of reactive groups on the impregnating material on which the glue should develop some chemical interactions. A specific photo-thermally curable epoxy glue has been developed in order to solve this problem with high robustness and stability.

Some of the epoxy based formulations prepared are listed in the following table.

|  | % Wt | |
| --- | --- | --- |
| Ingredients | L117 | L125 |
| Araldite 9699 (Huntsman) (aromatic epoxy oligomer) | 55.34 | 60.07 |
| Celloxide 2021P (Daicel) (cycloaliphatic epoxy monomer) | 7.38 | 0 |
| OXT221 (Toagosei Chemical) (oxetane monomer) | 25.24 | 27.4 |
| Silquest A187 (Momentive) (silane-epoxy adhesion promoter) | 6.64 | 7.2 |
| Anthracure UVS1331 (Kawasaki Chemical) (UV-Vis sensitizer) | 0.47 | 0.51 |
| 3-Perluorooctyl-1,2-propenoxide (Fluorochem) (fluorurated epoxy monomer) | 0.5 | 0 |
| PAG GSID26-1 (BASF) (photoinitiator for epoxy based systems) | 0 | 4.81 |
| PAG Irgacure 290 (BASF) (photoinitiator for epoxy based systems) | 4.43 | 0 |

Each formulation listed in the table is photosensitive toward radiation comprised between 250 nm and 420 nm.

It has been observed that formulation L125 containing the photoinitiator PAG GSID26-1 is able to reticulate at temperatures equal to or higher than 180° C. without any UV exposure energy. The formulation L117 is only able to reticulate when exposed to UV radiation.

Figure 2:
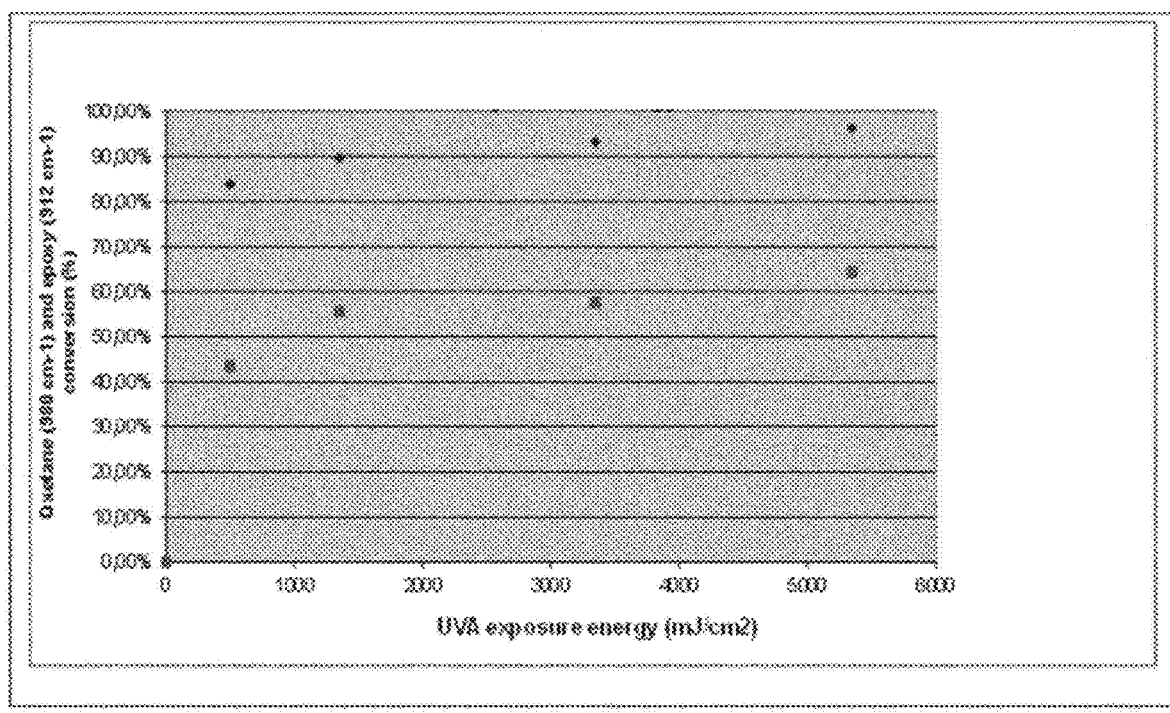
FIG. 2 shows a graph of the conversion of epoxy and oxetane functionalities contained in a preferred formulation during UV exposure.
Figure 3:
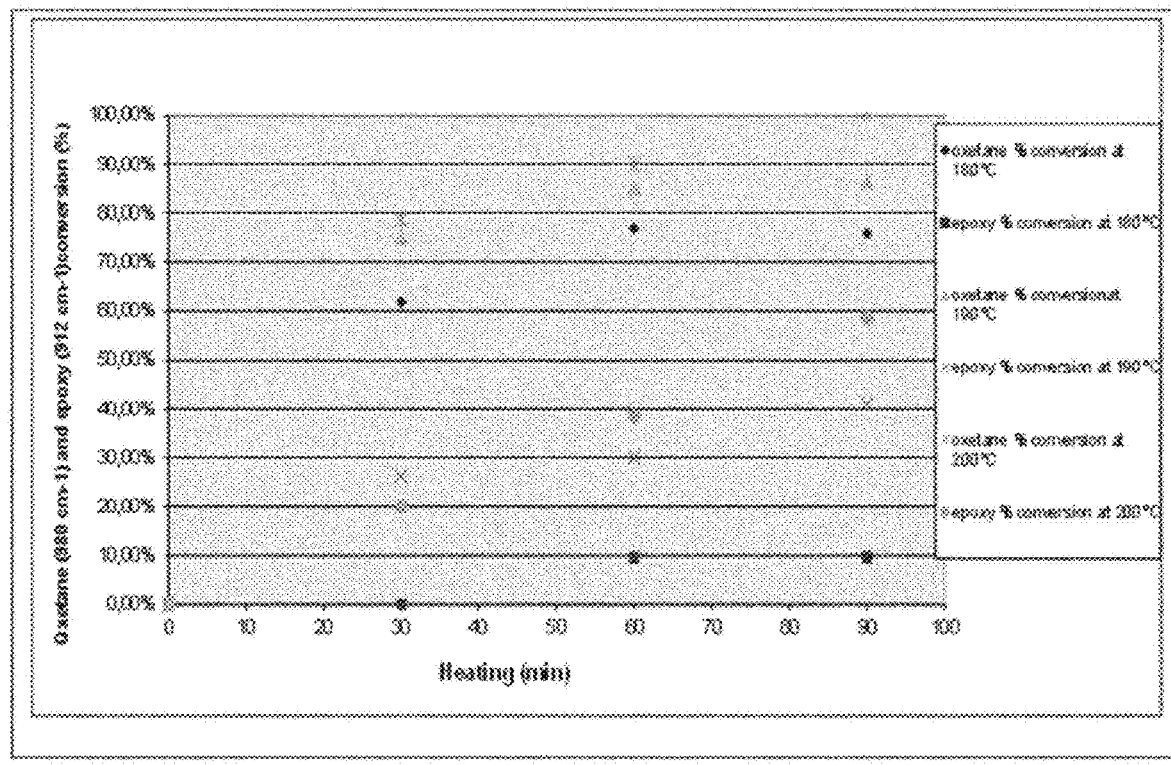
FIG. 3 shows a graph of the conversion of epoxy and oxetane functionalities contained in a preferred formulation during thermal treatment.

The formulation L125 has been analyzed by FTIR transmission spectroscopy collecting the data in FIGS. 2 and 3.

FIG. 2 depicts the epoxy (912 cm$^{-1}$) and oxetane (980 cm$^{-1}$) conversion (in %) of L125 as a function of UV exposure energy. The squares shows the epoxy conversion whereas the rhombi the oxetane conversion.

In FIG. 3 the epoxy (912 cm-1) and oxetane (980 cm-1) conversion (in %) of L125 as a function of temperatures (180° C., 190° C. and 200° C.) during heating (in min) is shown. The squares shows the epoxy conversion at 180° C., the rhombi the oxetane conversion at 180° C., the triangles the oxetane conversion at 190° C., the crosses the epoxy conversion at 190° C., the stars the the oxetane conversion at 200° C. and the circles the epoxy conversion at 200° C.

Once reticulated with UV exposure energies higher than 1000 mJ/cm2 and/or thermally cured to temperatures equal to or higher than 180° C. for 60 minutes, the material becomes very hard and chemically resistant toward water and solvent based inks. Once reticulated it is not swelled by the inks even after a 7 weeks contact at 45° C.

The thermal reactivity of L125 at temperatures higher than or equal to 180° C., make this formulation ideal for the bonding application on impregnated graphite.

The formulation is ideal for this application for two particular reasons:
- It bonds well the impregnated graphite material and the silicon chip attaining high resistance to the inks;
- It is both thermally and UV curable. This allows a high chemical resistance and high adhesive strength toward the impregnated graphite even in areas that cannot be reached by UV radiation.

The glue has been dispensed on the graphite material, particularly on the edges of the ink inlet hole (5) on which the silicon chip is overlapped.

Once the chip has been located on the glue ring (FIG. 4) an area of the glue will remain unexposed to UV radiation. The UV cured area guarantees the resistance toward liquid eventually present on top of the printing system and at the same time maintains the alignment position of the chip during the manufacturing process.

Figure 4:
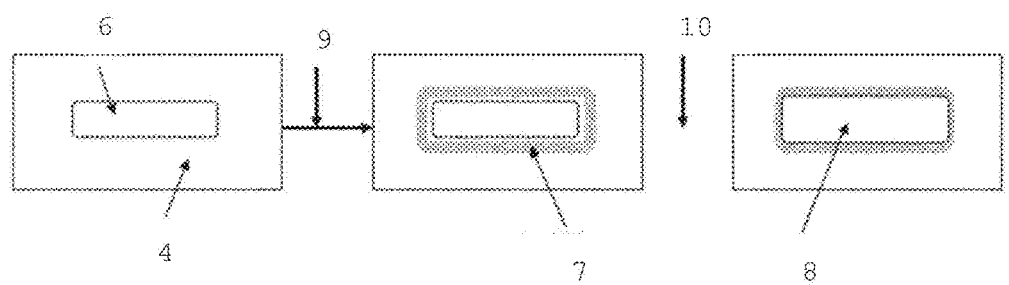
FIG. 4 shows a preferred embodiment of mounting a silicon chip on impregnated graphite.

FIG. 4 describes the bonding of the silicon ejector groups employed in the manufacturing process of one single module of a generic printing bar.

In a first step (9) a glue (7) ring is dispensed (grey area in FIG. 4) onto the impregnated module (4), particularly on the edges of the ink inlet hole (6) built in the porous material, which is here an impregnated graphite (4), on which the silicon chip (8) is overlapped only in a second step (10).

The alignment of the silicon chip during the following manufacturing steps is guaranteed by a UV exposure step that induces photoreticulation of the unshielded area of the uncovered perimetric area of the glue.

Optionally it could be useful to make a second UV exposure on the back side of the assembled part in order to induce photoreticulation of the glue also on the internal edges of the ink hole.

After these steps the glue could be thermally cured in order to complete the reticulation in all the areas of the device without losing alignment of the ejector groups.

It is important to guarantee a good reticulation degree of the unexposed area of the glue, in order to reach high adhesion and solvent resistance. In particular it is important to reach a certain reticulation degree in order to adhere to the impregnated graphite.

Once cured the glue attains very high chemical resistance to water and solvent based inks, maintaining its adhesive and mechanical performance even after 7 weeks in contact with inks at 45° C.

The impregnated graphite with the silicon chips bonded on top by the glue L125 a high endurance in pressure conditions (2 bar) for 2 weeks at room temperature without exhibiting any damage.

FIGS. 5 to 10 show the chemical structure of examples of the components of the formulation according to preferred embodiments.

FIG. 5 shows the structure of aromatic epoxy oligomer ARALDITE 9699 (Huntsman), used according to a preferred embodiment. The structure of 9,10-dibuthoxy anthracene, a photosensitizer, is shown in FIG. 6. FIG. 7 shows the structure of silane-epoxy adhesion promoter SILQUEST A187 (Momentive), used according to a preferred embodiment of the invention.

The structure of oxetane monomer OXT 221 (Toagosei Chemical) can be taken from FIG. 8. FIG. 9 depicts the structure of a fluorinated epoxy monomer, namely 3-Perluorooctyl-1,2-propenoxide. In FIG. 10 the structure of a cycloaliphatic epoxy monomer CELLOXIDE 2021P (Daicel) is shown.

REFERENCE SIGNS

1 printing module
2 macrohydraulic channel
3 through hole
4 porous material
5 ejector group
6 inklet hole
7 glue
8 silicon chip

The invention claimed is:

1. An adhesive formulation for bonding two materials at least one of which being an impregnated or impermeabilized material, comprising
   40 to 80 wt.-% of an epoxy monomer; and
   15 to 30 wt.-% of an oxetane monomer; and
   0.1 to 10 wt.-% of an adhesion promotor; and
   0.1 to 5 wt.-% of a sensitizer; and
   1 to 10 wt.-% of a radiation and temperature activatable photoinitiator or a mixture of a photoinitiator and a thermal initiator,
and further comprising a flururated epoxy monomer being 3-Perfluorooctyl-1,2-propenoxide.

2. The formulation according to claim 1, wherein the epoxy monomer is selected from the group consisting of an epoxy cresol novolac, (3',4'-epoxycyclohexane)methyl 3,4-epoxycyclohexylcarboxylate 3,4-Epoxycyclohexylmethyl 3,4-epoxycyclohexanecarboxylate; Diglycidyl 1,2-cyclohexanedicarboxylate; Cyclohexene oxide; 1,2,5,6-Diepoxycyclooctane and Poly[(phenyl glycidyl ether)-co-formaldehyde].

3. The formulation according to claim 1, wherein the oxetane monomer is selected from the group consisting of bis[1-ethyl(3-oxetanyl)]methyl ether, 3-Ethyl-3-oxetanemethanol; 3,3-Dimethyloxetane and 3-ethyl-3-[(2-ethylhexyloxy)methyl]oxetane.

4. The formulation according to claim 1, wherein the adhesion promotor is a silane-epoxy adhesion promoter.

5. The formulation according to claim 1, wherein the sensitizer is a UV-Vis sensitizer.

6. The formulation according to claim 1, wherein the radiation and temperature activatable photoinitiator is a cationic photoinitiator.

7. The formulation according to claim 1, wherein in the mixture of photoinitiator and thermal initiator the thermal initiator is an anhydride and the photoinitiator is a cationic photoinitiator.

8. The formulation according to claim 1, wherein the adhesion promotor is selected from the group consisting of gamma-glycidoxypropyltrimethoxysilane, (3-Glycidyloxypropyl)triethoxysilane; (3-Glycidyloxypropyl)trimethoxysilane and Trimethoxy[2-(7-oxabicyclo[4.1.0] kept-3-yl) ethyl] silane.

9. The formulation according to claim 1, wherein the sensitizer is selected from the group consisting of anthracene; 9-Fluorenone; perylene and 9,10-diethoxyanthracene.

10. The formulation according to claim 1, wherein in the mixture of photoinitiator and thermal initiator the thermal initiator is selected from the group consisting of Phtalic anhydride; Maleic anhydride; Cyclobutane-1,2,3,4-tetracarboxylic dianhydride; Benzoic anhydride and Oleic anhydride, and the photoinitiator is selected from the group consisting of Diphenyliodonium hexafluorophosphate, diphenyliodonium hexafluoroantimonate, Triarylsulfonium hexafluorophosphate salts and Triphenylsulfonium triflate.

11. The formulation according to claim 1, wherein the adhesion promotor is gamma-glycidoxypropyltrimethoxysilane.

12. The formulation according to claim 1, wherein the two materials are an impregnated graphite material and a silicon material.

13. A method for bonding at least two parts of which one is at least an impregnated or impermeabilized material, comprising the following steps:
  applying to one part an adhesive formulation for bonding two materials at least one of which being an impregnated or impermeabilized material, comprising
  40 to 80 wt.-% of an epoxy monomer; and
  15 to 30 wt.-% of an oxetane monomer; and
  0.1 to 10 wt.-% of an adhesion promotor; and
  0.1 to 5 wt.-% of a sensitizer; and
  1 to 10 wt.-% of a radiation and temperature activatable photoinitiator or a mixture of a photoinitiator and a thermal initiator,
  and further comprising a fluorurated epoxy monomer being 3-Perfluorooctyl-1,2-propenoxide;
  placing another part to be bond on the one part;
  exposing the parts to UV light radiation; and
  heat treating of the part.

* * * * *